(12) United States Patent
Ono et al.

(10) Patent No.: US 10,882,290 B2
(45) Date of Patent: Jan. 5, 2021

(54) PACKAGING SHEET, AND PACKAGING CONTAINER AND PACKAGING METHOD USING THE PACKAGING SHEET

(71) Applicant: Osaka Sealing Printing Co., LTD., Osaka (JP)

(72) Inventors: Shinichi Ono, Osaka (JP); Takayuki Kimura, Osaka (JP); Hidenao Takeuchi, Osaka (JP); Masahiko Yoshida, Osaka (JP); Hidenobu Harima, Osaka (JP)

(73) Assignee: Osaka Sealing Printing Co., LTD., Osaka (JP)

( * ) Notice: Subject to any disclaimer, the term of this patent is extended or adjusted under 35 U.S.C. 154(b) by 0 days.

(21) Appl. No.: 16/069,352

(22) PCT Filed: Jan. 14, 2016

(86) PCT No.: PCT/JP2016/050932
§ 371 (c)(1),
(2) Date: Jul. 11, 2018

(87) PCT Pub. No.: WO2017/122311
PCT Pub. Date: Jul. 20, 2017

(65) Prior Publication Data
US 2019/0022989 A1    Jan. 24, 2019

(51) Int. Cl.
*B32B 27/20* (2006.01)
*B41M 5/26* (2006.01)
(Continued)

(52) U.S. Cl.
CPC ............... *B32B 27/20* (2013.01); *B32B 7/12* (2013.01); *B32B 27/08* (2013.01); *B32B 27/32* (2013.01);
(Continued)

(58) Field of Classification Search
CPC ........... B32B 27/20; B32B 7/12; B32B 27/08; B32B 27/32; B41M 5/0094; B41M 5/26;
(Continued)

(56) References Cited

U.S. PATENT DOCUMENTS 4,857,501 A * 8/1989 Usami .................. B41M 5/3375
503/200
5,210,066 A * 5/1993 Sakurai ................ B41M 5/3372
427/152
(Continued)

FOREIGN PATENT DOCUMENTS

JP      H06-286310 A      10/1994
JP      09188314 A  *    7/1997
(Continued)

OTHER PUBLICATIONS

Machine translation of JP-WO2015/072410-A1.*
(Continued)

*Primary Examiner* — Jes F Pascua
(74) *Attorney, Agent, or Firm* — Rankin, Hill & Clark LLP (57) ABSTRACT

Provided are a packaging sheet and a packaging container where it is unnecessary to paste a printed label and disappearance or color development due to friction or the like after thermal printing do not occur. The packaging sheet includes a heat seal layer 10 for thermally welding by heating, a heat-sensitive layer 40 including a color developing material that develops a color by heating, and a base material layer 70 that secures the strength and protects the heat-sensitive layer 40. The heat seal layer 10, the heat-sensitive layer 40, and the base material layer 70 are provided in this order from a back surface side in a thickness direction. The packaging sheet is transparent before the heat-sensitive layer 40 develops the color.

13 Claims, 3 Drawing Sheets

(51) Int. Cl.

| | | |
|---|---|---|
| *B41M 5/337* | (2006.01) | |
| *B65D 65/40* | (2006.01) | |
| *B41M 5/323* | (2006.01) | |
| *B32B 7/12* | (2006.01) | |
| *B32B 27/08* | (2006.01) | |
| *B32B 27/32* | (2006.01) | |
| *B41M 5/00* | (2006.01) | |
| *B41M 5/30* | (2006.01) | |
| *B41M 5/40* | (2006.01) | |
| *B65B 11/10* | (2006.01) | |
| *B65B 41/12* | (2006.01) | |
| *B65B 61/02* | (2006.01) | |
| *B65D 75/26* | (2006.01) | |

(52) U.S. Cl.
 CPC ............ *B41M 5/0094* (2013.01); *B41M 5/26* (2013.01); *B41M 5/30* (2013.01); *B41M 5/323* (2013.01); *B41M 5/337* (2013.01); *B41M 5/3375* (2013.01); *B41M 5/40* (2013.01); *B65B 11/10* (2013.01); *B65B 41/12* (2013.01); *B65B 61/025* (2013.01); *B65D 65/40* (2013.01); *B65D 75/26* (2013.01); *B32B 2307/31* (2013.01); *B32B 2307/412* (2013.01); *B32B 2307/75* (2013.01); *B32B 2439/46* (2013.01)

(58) Field of Classification Search
 CPC . B41M 5/30; B41M 5/40; B65B 11/10; B65B 41/12; B65B 61/025; B65D 65/40; B65D 75/26
 USPC .......................................................... 383/106
 See application file for complete search history.

(56) References Cited

U.S. PATENT DOCUMENTS

| | | | | |
|---|---|---|---|---|
| 5,380,693 | A * | 1/1995 | Goto | B41M 5/3333 427/152 |
| 5,643,851 | A * | 7/1997 | Konagaya | B41M 5/363 503/201 |
| 5,677,365 | A * | 10/1997 | Kikuta | B41M 5/3331 523/201 |
| 5,840,657 | A * | 11/1998 | Mehta | G09F 3/10 504/280 |
| 5,888,929 | A * | 3/1999 | Iida | B41M 5/30 374/E11.021 |
| 6,921,740 | B1 * | 7/2005 | Hizatate | B41M 5/3333 503/200 |
| 9,505,254 | B2 * | 11/2016 | Jarvis | C09D 11/037 |
| 9,878,567 | B2 * | 1/2018 | Ono | B41M 5/42 |
| 9,902,131 | B2 * | 2/2018 | Ono | B41M 5/42 |
| 10,308,398 | B2 * | 6/2019 | Miller | B65D 33/004 |
| 2002/0065197 | A1 * | 5/2002 | Liang | B41M 5/42 503/226 |
| 2007/0116910 | A1 * | 5/2007 | Polykarpov | B32B 15/08 428/35.2 |
| 2007/0269740 | A1 * | 11/2007 | Blank | B41M 5/30 430/270.1 |
| 2008/0218570 | A1 * | 9/2008 | Kovacs | C09D 11/101 347/88 |
| 2012/0208698 | A1 * | 8/2012 | Hayakawa | B41M 5/42 503/216 |
| 2013/0053240 | A1 * | 2/2013 | Takahama | B41M 5/42 503/200 |
| 2017/0190474 | A1 * | 7/2017 | Miller | B41J 11/0005 |

FOREIGN PATENT DOCUMENTS

| | | | | |
|---|---|---|---|---|
| JP | 2005181072 | A | * | 7/2005 |
| JP | 2005289401 | A | | 10/2005 |
| JP | 2010241471 | A | * | 10/2010 |
| JP | 2011025931 | | | 2/2011 |
| JP | 5387105 | B2 | * | 1/2014 |
| JP | 2014218024 | A | * | 11/2014 |
| JP | WO2015/072410 | A1 | * | 5/2015 |
| WO | 2015072410 | A1 | | 5/2015 |

OTHER PUBLICATIONS

Feb. 11, 2020 machine translation of JP-09188314-A.*
Feb. 11, 2020 machine translation of JP-2014218024-A.*
International Search Report dated Apr. 19, 2016 filed in PCT/JP2016/050932.
Zhu et al., "Chapter 6 Post-press Processing of Plastic Printed Matter", Plastic Printing Technology and Application, Printing Industry Press, 2014 and its English translation; Cited in CNOA.
Chinese Office Action (CNOA) dated Oct. 20, 2020 issued in the corresponding Chinese Patent Application No. 201680078742.3.

* cited by examiner

PACKAGING SHEET, AND PACKAGING CONTAINER AND PACKAGING METHOD USING THE PACKAGING SHEET

TECHNICAL FIELD

The present invention relates to a transparent heat-sensitive packaging sheet on which thermal printing can be performed later, and to a packaging container and a packaging method using the same.

BACKGROUND ART

On a packaging container of a product, various pieces of information including the product name, ingredients, the date of manufacture, the expiration date, the product management number, and the lot number are displayed. To display these pieces of information on the packaging container after the product is packaged, conventionally, a separately printed label is pasted, the information is thermally transferred using an ink ribbon, or the packaging container is formed of a heat-sensitive material and the information is thermally printed using a thermal head, for example.

For example, a label suggested in Patent Literature 1 employs a heat-sensitive color developing layer. A packaging material suggested in Patent Literature 2 includes a heat-sensitive layer.

CITATION LIST

Patent Literature

Patent literature 1: JP-A-H-6-286310
Patent literature 2: JP-A-2005-289401

SUMMARY OF THE INVENTION

Problems to be Solved by the Invention

However, it is a complicated work to prepare and paste a label as a separate member. In addition, if the information is thermally printed on packaging paper by thermal transfer, the thermally printed information may disappear as the packaging container is rubbed with another packaging container or with other object. If the packaging container formed of a heat-sensitive material is rubbed with another packaging container or other object, the packaging container may develop a color due to a friction heat. The problems described above have been difficult to overcome.

The present invention has been made in order to solve the above problem. An object of the present invention is to provide the following packaging sheet and packaging container. In regard to the packaging sheet and the packaging container, it is unnecessary to paste a printed label on the packaging sheet or the packaging container and the disappearance or the color development due to the friction or the like after the thermal printing will not occur.

Solution to the Problems (1) A packaging sheet according to the present invention includes: a heat seal layer for thermally welding by heating; a heat-sensitive layer including a color developing material that develops a color by heating; and a base material layer that secures a strength and protects the heat-sensitive layer, wherein: the heat seal layer, the heat-sensitive layer, and the base material layer are provided in this order from a back surface side in a thickness direction; and the packaging sheet is transparent before the heat-sensitive layer develops the color.

By the above structure, since the heat seal layer is provided, it is easy to package a product or the like through thermal welding. Moreover, it is easy to form a packaging container. In addition, since the heat-sensitive layer including the color developing material that develops the color by heating is provided, the thermal printing at an arbitrary timing is possible. Therefore, after the product is packaged, the information regarding the product can be displayed by thermal printing the information on the packaging container without using a separate member such as a label. In addition, since the base material layer is more on the front side than the heat-sensitive layer, the heat-sensitive layer can be sufficiently protected from the friction or the like. Specifically, the thermally printed information with the developed color will not disappear due to the friction or the heat-sensitive layer will not develop a color due to the friction. The packaging sheet is transparent before the color is developed. Therefore, the packaged article can be easily seen after the packaging, and the packaging sheet is excellent in design.

In the present specification, "printing" refers to printing of a color, a picture, letters, or the like directly on the base material layer and the like with ink, dye, or the like, and "thermal printing" refers to thermal printing of a color, a picture, letters, or the like directly by making the heat-sensitive layer develop a color.

(2) In the packaging sheet according to the present invention, it is preferable that before the heat-sensitive layer develops the color, the opacity based on JIS P8138 is 25% or less. The packaging sheet and the packaging container formed by this packaging sheet are excellent in transparency. Therefore, when contents such as a product or merchandise are packaged, the concealment of the contents can be reduced.

(3) It is preferable that the heat-sensitive layer includes a first diffused reflection suppression component for suppressing diffused reflection in the heat-sensitive layer. In this structure, the heat-sensitive layer includes the first diffused reflection suppression component; therefore, the diffused reflection in the heat-sensitive layer can be suppressed and the transparency of the packaging sheet can be improved.

(4) It is preferable that the first diffused reflection suppression component includes a low-melting-point material with a melting point lower than a color developing temperature of the color developing material. The first diffused reflection suppression component melts and fills the space in the heat-sensitive layer at least when the heat-sensitive layer develops the color; thus, the diffused reflection in the heat-sensitive layer can be suppressed.

(5) It is preferable that the low-melting-point material includes paraffin. There are various kinds of paraffin melting at various temperatures. Since paraffin has a melting point, paraffin easily melts at least when the heat-sensitive layer develops the color and the diffused reflection can be suppressed more easily.

(6) It is preferable that the packaging sheet further includes an intermediate layer in contact with the heat-sensitive layer, wherein: the intermediate layer includes a second diffused reflection suppression component for suppressing diffused reflection in the packaging sheet; and the second diffused reflection suppression component includes hydrophilic resin or water-soluble resin.

In the above structure, the intermediate layer includes the second reflection suppression component. Therefore, the intermediate layer also suppresses the deterioration in transparency due to the diffused reflection. Thus, the transparency of the packaging sheet can be improved further. The second reflection suppression component included in the intermediate layer includes the hydrophilic resin or the water-soluble resin. Therefore, it becomes easy to protect the heat-sensitive layer from the penetration of oily substances.

(7) In the packaging sheet according to the present invention, it is preferable that the color developing material is dispersed in an organic solvent. In the above structure, since the color developing material is dispersed in the organic solvent, the heat-sensitive layer can be formed by a general printing technique such as gravure printing. In a case of providing the printing layer, the printing layer and the heat-sensitive layer can be formed in one step.

(8) It is preferable that the second diffused reflection suppression component is a core-shell type particle including the hydrophilic resin or the water-soluble resin in a shell. In the case of using such a core-shell type particle, the hydrophilic resin or the water-soluble resin included in the shell can penetrate into the heat-sensitive layer in contact with the intermediate layer. Therefore, the effect of suppressing the diffused reflection in the packaging sheet can be increased further.

In addition, in a case of using lipophilic resin in the core that remains in the intermediate layer, the intermediate layer can have the water resistance. Thus, the water resistance of the packaging sheet can be increased.

(9) It is preferable that the packaging sheet further includes a printing layer on the back surface side of the base material layer, wherein the printing layer is formed in contact with the base material layer. By this structure, the packaging sheet excellent in design by the printed information on the printing layer can be obtained. In addition, since the printing layer is formed on the back surface side of the base material layer, the front surface side of the printing layer is protected by the base material layer. Therefore, even if the front surface side of the packaging sheet is rubbed with another packaging sheet or the like, the printed information is not damaged. Furthermore, since the packaging sheet has high transparency, the printed information can be seen clearly from the front surface side.

(10) A packaging container according to the present invention includes: a cylindrical part formed by bending in a cylindrical shape, the packaging sheet with a rectangular or band-like shape; an axial-direction welding part formed to extend in an axial direction by thermally welding the heat seal layer on one end and the heat seal layer on the other end, the heat seal layers facing each other in a direction orthogonal to an axis of the cylindrical part; and an end welding part formed to extend in the direction orthogonal to the axis by thermally welding the heat seal layers on one end in the axial direction of the cylindrical part to each other.

Since this packaging container is a packaging bag formed using the packaging sheet according to the present invention, the packaging container has a function similar to the function of the packaging sheet according to the present invention. That is to say, since the packaging container includes the heat-sensitive layer, the display is possible by the thermal printing at an arbitrary timing in the process or after the container is formed, and moreover the thermally printed information will not be damaged due to friction. In addition, since the container has high transparency, the contents can be seen before the container is opened. This packaging container can be manufactured easily by thermally welding the heat seal layers to each other.

(11) It is preferable that the packaging container is a pillow packaging container.

The pillow packaging container is a packaging container for general purposes and can be formed by a small-scaled packaging device. Therefore, the packaging container according to the present invention can be used for general purposes and at low cost.

(12) A packaging method according to the present invention is a packaging method for packaging contents with the packaging sheet and includes: a bending step of bending the packaging sheet with a rectangular or band-like shape into a cylindrical shape; an axial-direction welding part formation step of forming an axial-direction welding part that extends in an axial direction by thermally welding the heat seal layer on one end of the packaging sheet that is bent into the cylindrical shape and the heat seal layer on the other end, the heat seal layers facing each other in a direction orthogonal to an axis of the cylindrical part; an end welding part formation step of forming an end welding part that extends in the direction orthogonal to the axis by thermally welding to each other the heat seal layers on an end in the axial direction of the packaging sheet bent into the cylindrical shape; and a thermal printing step of thermally printing by heating a part of the heat-sensitive layer so as to develop the color.

In such a packaging method, the contents can be packaged in the packaging sheet according to the present invention in a simple manner. In addition, since the thermal printing step can be provided at an arbitrary timing, for example, the writing about the contents can be performed at an arbitrary timing.

(13) It is preferable that the thermal printing step is performed after the end welding part formation step. Since the thermal printing step is performed after the end welding part formation step, that is, after the contents are packaged, the information that is difficult to print in advance, such as the date of manufacture, can be written easily without using a separately printed label or the like.

Effect of the Invention

According to the present invention, it is possible to provide the packaging sheet and the packaging container where it is unnecessary to paste a printed label and the disappearance of the printed information or the color development due to the friction or the like after the thermal printing do not occur. In addition, it is possible to provide the packaging method using the packaging sheet.

BRIEF DESCRIPTION OF THE DRAWINGS

FIG. 2A and FIG. 2B are perspective views of a packaging container according to a second embodiment of the present invention, in which

DESCRIPTION OF THE EMBODIMENTS

First Embodiment

A packaging sheet according to a first embodiment in which a packaging sheet according to the present invention is used will be described with reference to FIG. 1A and FIG. 1B. In the following description, a direction and an orientation refer to the direction and the orientation shown in the drawing.

1. Layer Structure

Figure 1A:
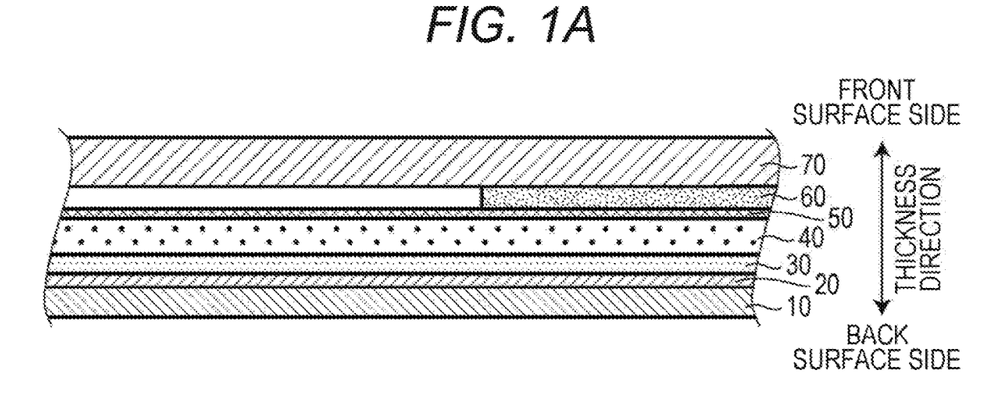
FIG. 1A and FIG. 1B are schematic cross-sectional views of a packaging sheet according to a first embodiment of the present invention.

FIG. 1A is a schematic cross-sectional view of a packaging sheet according to the present embodiment. As illustrated in FIG. 1A, the packaging sheet includes a heat seal layer 10, a heat-sensitive layer 40 including a color developing material that develops a color by heating, and a base material layer 70 that secures the strength and protects the heat-sensitive layer 40. The heat seal layer 10, the heat-sensitive layer 40, and the base material layer 70 are provided in this order from a back surface side in a thickness direction (hereinafter, simply referred to as a back surface side). Before the heat-sensitive layer 40 develops the color, the packaging sheet is transparent as a whole.

In addition, on the back surface side of the heat-sensitive layer 40, an intermediate layer 30 for protecting the heat-sensitive layer 40 is stacked. Between the intermediate layer 30 and the heat seal layer 10 is further provided a protective layer 20. The protective layer 20 protects the layers stacked more on a front surface side than the intermediate layer 30, and improves the adhesion with the heat seal layer 10.

On the other hand, a printing layer 60 is further provided to a part of the base material layer 70 on the back surface side. This printing layer is formed in contact with the base material layer 70. On the other hand, an undercoat layer 50 is further provided on the front surface side in the thickness direction of the heat-sensitive layer 40 (hereinafter simply referred to as a front surface side). The undercoat layer 50 improves the adhesion between the heat-sensitive layer 40 and the printing layer 60 or the base material layer 70. Note that FIG. 1A and the other drawings are schematic diagrams for describing the embodiment and are not perfectly accurate. For example, the thickness ratio of the layers does not express the actual thickness of each layer. Moreover, a portion where the printing layer 60 is not formed is not a vacant layer; however, in fact, the base material layer 70 and the undercoat layer 50 are in direct contact with each other. Moreover, a portion where the printing layer 60 is not formed is not a vacant layer; however, in fact, the base material layer 70 and the undercoat layer 50 are in direct contact with each other.

Next, the structure of each layer will be described in detail.

(Base Material Layer)

The base material layer 70 is formed of a transparent biaxially oriented polypropylene film (OPP film) with a thickness of 40 μm. This material is used for general purposes, inexpensive, and highly transparent, and therefore has been widely employed as a packaging material. By using such a material, the transparency of the packaging sheet is maintained.

Therefore, the base material layer 70 can be formed of various materials that have the transparency, can protect the heat-sensitive layer 40, and achieve the packaging strength. Examples thereof include polyolefin resin such as polyethylene and polypropylene, styrene resin such as polystyrene, polyester resin such as polyethylene terephthalate, and carbonate resin such as polycarbonate. Any of these kinds of resin may be used alone. Alternatively, two or more of these kinds of resin may be used in combination. The resin may be used in combination with an OPP film. The resin may be either a non-oriented film or an oriented film. The oriented film may be either a uniaxially oriented film or a biaxially oriented film. Furthermore, the resin may be either a single-layer film or a multilayer film. In regard to the requirement of transparency, not just colorless transparency but also colored transparency may be employed.

From the aspect of transparency, easy handling, and easy formation of other layers, for example, the base material layer 70 has a thickness of, for example, 2 to 150 μm, preferably 10 to 100 μm, and more preferably 20 to 70 μm.

(Heat-Sensitive Layer)

The packaging sheet includes the heat-sensitive layer 40. Therefore, when this layer develops the color by heating, the information can be thermally printed on the packaging sheet at an arbitrary timing. Moreover, as described above, the base material layer 70 is transparent and therefore, the thermally printed information can be viewed from the front.

In the heat-sensitive layer 40, a color developing material that develops a color by heating, and if necessary, a binder, a lubricant, and the like are dispersed in a dispersion medium and then stacked. The dispersion medium may be the organic solvent. In this case, the heat-sensitive layer 40 can be stacked by a general printing technique such as gravure printing, offset printing, rotary letterpress printing, or silk screen printing. On the other hand, if the lamination by such a printing technique is not necessary, for example when the heat-sensitive layer 40 is formed by a coater, water or a water-soluble dispersion medium may be used.

As the color developing material, a transparent or light-color dye (leuco dye) and a developer that can make the dye develop a color by heating are used in combination. Since such a color developing material is widely used for heat-sensitive recording paper, the color developing material is easily obtained and usable for general purposes.

As the leuco dye, a known dye can be used. In the case of using the organic solvent as the dispersion medium, the following solvents are preferably used because, for example, the leuco dye does not dissolve in the solvent: 3-diethylamino-7-(m-trifluoromethylanilino)fluoran (see JP-A-2000-289345 and JP-A-2000-289345); 2-(o-fluoroanilino)-6-diethylaminofluoran and 2-(o-chloroanilino)-6-diethylaminofluoran (JP-A-H-10-100543 and JP-A-H-9-118075); 3-diethylamino-7-(o-fluoroanilino)fluoran, and 3-diethylamino-7-(o-chloroanilino)fluoran (JP-A-H-9-156233, etc.).

In the case of using water or the like as the dispersion medium, the following leuco dyes can be used additionally: triphenylmethane phthalide, triallyl methane, fluoran, phenothiziane, thiofluoran, xanthene, indophthalyl, spiropyran, azaphthalide, chromenopyrazole, methine, rhodamine anilino lactam, rhodamine lactam, quinazoline, diazaxanthene, and bislactone. Any one kind of the leuco dyes may be used alone. However, thermal printing with a desired color is possible when two or more kinds are used in combination.

Of the above-described leuco dyes, a fluoran-based leuco dye and a phthalide-based leuco dye are preferred. Examples of the fluoran-based leuco dye may include 3-alkyl-2-anilino-6-(N,N-dialkylamino)fluoran such as 2-anilino-6-diethylamino-3-methylfluoran, 2-anilino-6-(N-n-propyl-N-methylamino)-3-methylfluoran, 2-anilino-6-(N-sec-butyl-N-ethylamino)-3-methylfluoran, 2-anilino-6-di(n-butyl)amino-3-methylfluoran, and 6-(N-isopentyl-N-ethyl)amino-3-methyl-2-o-chloroanilino fluoran, 3-alkyl-2-anilino-6-(N- alkoxyalkyl-N-alkylamino)fluoran such as 2-anilino-6-(N-ethoxypropyl-N-ethyl)amino-3-methylfluoran, 3-alkyl-2-anilino-6-(N-alkyl-N-cycloalkylamino)fluoran such as 2-anilino-3-methyl-6-(N-cyclohexyl-N-methylamino)fluoran, 3-alkyl-2-anilino-6-(N-alkyl-N-arylamino)fluoran such as 2-anilino-3-methyl-6-(N-methyl-N-p-toluidino)fluoran and 2-anilino-3-methyl-6-(N-ethyl-N-p-toluidino)fluoran, 2-anilino-3-alkylfluoran compounds having a cyclic amino group at 6-position such as 2-anilino-3-methyl-6-pyrrolidinofluoran, 2-halogenated anilino-6-dialkylaminofluoran such as 2-(o-chloroanilino)-6-diethylaminofluoran, dialkylamino-dialkylfluoran such as 3-dimethylamino-5-methyl-7-methylfluoran and 3-diethylamino-6-methyl-8-methylfluoran, and halogenated fluoran having a dialkylamino group such as 3-dibutylamino-6-methyl-7-bromofluoran and 3-diethylamino-7-chlorofluoran.

Examples of the phthalide-based leuco dye may include 6-(dimethylamino)-3,3-bis[p-(dimethylamino)phenyl]phthalide (crystal violet lactone), 3-[2,2-bis(1-ethyl-2-methyl-3-indolyl)vinyl]-3-(4-diethylaminophenyl)phthalide, 3-[1,1-bis(4-diethylaminophenyl)ethylene-2-yl]-6-dimethylaminophthalide, 3,3-bis(1-n-butyl-2-methylindole-3-yl)phthalide, and 3,3-bis(4-diethylamino-2-ethoxyphenyl)-4-azaphthalide.

As the developer, an electron acceptor such as an acid material can be widely used. In accordance with the kind of leuco dye, a known developer may be selected as appropriate. In the case of using the organic solvent as the dispersion medium, it is preferable to use bis(3-allyl-4-hydroxyphenyl)sulfone (see JP-A-2000-326635), the following formula (1) (see JP-A-2000-289343), the following formula (2) (see JP-A-H-10-100543), or the like.

[Chemical Formula 1]

(1)

[Chemical Formula 2]

(2)

If the dispersion medium is water or the like, there is no particular limitation. It is possible to use an acid inorganic substance (such as bentonite, zeolite, or silica gel), carboxylic acid (aliphatic monocarboxylic acid such as stearic acid, polycarboxylic acid such as oxalic acid or maleic acid, aliphatic hydroxycarboxylic acid such as tartaric acid, citric acid, or succinic acid, and aromatic carboxylic acid such as benzoic acid), or a compound with a phenolic hydroxyl group. Any of these developers can be used alone or two or more kinds thereof may be used in combination.

Examples of the compound having a phenolic hydroxyl group may include hydroxyarene (for example, 4-tert-butylphenol, 4-phenylphenol, and (3-naphthol), hydroxyarene carboxylic acid (for example, salicylic acid, 3-tert-butylsalicylic acid, 2-hydroxy-6-naphthoic acid, 2-hydroxy-p-tolilic acid, and 4-hydroxyphthalic acid), hydroxyarene carboxylic acid ester (for example, 5-hydroxyphthalic acid dimethyl, methyl-4-hydroxybenzoate, and 4-hydroxybenzoic acid ethyl), hydroxyarene carboxylic acid amide such as salicylanilide, metal salts of hydroxyarene carboxylic acid (for example, zinc salicylate, 2-hydroxy-6-zinc naphthoate, and 3,5-di-tert-tin butyl salicylate), bisphenols (for example, hydroxy biphenyl such as 2,2'-dihydroxydiphenyl, 4,4'-isopropylidendiphenol, and 4,4'-isopropylidenbis(2-chlorophenol)), novolac-type phenolic resin, diarylsulfone having a phenolic hydroxyl group (for example, di(4-hydroxyphenyl)sulfone and 4,2'-dihydroxydiphenylsulfone), and diaryl sulfide having a phenolic hydroxyl group (for example, bis(4-hydroxyphenyl)sulfide).

When the color developing material such as the leuco dye or the developer has the larger particle diameter, the particle diffuses light and the transparency of the heat-sensitive layer 40 and the packaging sheet deteriorates. Therefore, the particle diameter of the color developing material is preferably smaller. In view of this, the average particle diameter of the color developing material (such as leuco dye or developer) is, for example, 0.1 to 3 μm, preferably 0.1 to 1 μm, and more preferably 0.1 to 0.7 μm. In the present specification, the average particle diameter refers to 50%-average diameter (median diameter) in the particle size distribution based on the volume that is measured using a laser analysis/scattering particle size analyzer of Microtrac.

The color developing temperature of the color developing material is different depending on the kind of the color developing material. The kind of color developing materials may be selected as appropriate so that the heat is generated at desired heat generation temperature in accordance with the thermal printing condition. Instead of the combination between the leuco dye and the color developer, a dye that can develop a color by itself may be used.

The amount of color developing material in the heat-sensitive layer 40 may be selected as appropriate in accordance with the light absorbance in a visible light region when the color developing material develops the color. The color developing material is contained by, for example, 10 to 70 mass %, preferably 20 to 60 mass %, and more preferably 30 to 50 mass %. If the color developing material includes the leuco dye and the developer, the mass ratio of the developer to the leuco dye (=developer/dye) can be selected as appropriate in accordance with the kind thereof. The mass ratio is, for example, 1/1 to 5/1, preferably 1.5/1 to 3/1.

The heat-sensitive layer 40 may contain the binder to bind the color developing material. Examples of the binder include resin and polymer (such as synthetic polymer and natural polymer). The binder is preferably a hydrophilic or water-soluble binder, or a water-dispersive binder.

Examples of such a binder may include vinyl acetate resin or saponified products thereof (for example, homopolymers or copolymers of vinyl acetate such as polyvinyl acetate, vinyl acetate-maleic anhydride copolymers, and vinyl acetate-vinyl chloride copolymers, polyvinyl alcohol (PVA), and modified PVA (saponified products of vinyl acetate copolymers)), olefin resin (for example, copolymers between olefin and polymerizable unsaturated carboxylic acid or anhydrides thereof such as isopropylene-maleic anhydride copolymers, isobutylene-maleic anhydride copolymers, diisobutylene-maleic anhydride copolymers, and methyl vinyl-maleic anhydride copolymers), styrene resin (for example, polystyrene, and copolymers between styrene and polymerizable unsaturated carboxylic acid or anhydrides thereof such as styrene-maleic anhydride copolymers), polyamide resin (for example, polyamide, polyester amide, and polyamide imide), vinyl cyanide resin (for example, polyacrylonitrile, and acrylonitrile copolymers), acrylic resin (for example, poly(meth)acrylic acid, polyacrylic acid ester, copolymers between (meth)acrylic acid and (meth)acrylic acid ester such as acrylic acid-acrylic acid ester copolymers, and acrylamide resin such as polyacrylamide and modified polyacrylamide), alkyl vinyl ether resin (for example, polymethyl vinyl ether), vinyl chloride or vinylidene chloride resin (for example, polyvinyl chloride, polyvinylidene chloride, and copolymers containing vinyl chloride and/or vinylidene chloride as a monomeric unit), urethane resin (for example, polyether polyurethane and polyester polyurethane), polyvinylpyrollidone, rubber-like polymers (for example, styrene-butadiene rubber (SBR) and acryl rubber), rubber (for example, gum arabic), cellulose derivatives (for example, cellulose ethers such as methyl cellulose, carboxymethyl cellulose, hydroxyethyl cellulose, and hydroxypropyl cellulose), polysaccharides (for example, starch and modified starch), and protein (for example, casein, gelatin, and glue).

In the above-described binder, examples of the polymerizable unsaturated carboxylic acid or anhydrides thereof which are copolymerizable monomers may include carboxylic acid having an ethylene unsaturated bond or anhydrides thereof such as (meth)acrylic acid, maleic acid, fumaric acid, and maleic anhydrides. The use of the polymerizable unsaturated carboxylic acid or anhydrides thereof as copolymerizable monomers allows carboxyl groups or acid anhydride groups to be introduced into resin. This can impart hydrophilicity or water-solubility. It is noted that acrylic acid and methacrylic acid are collectively referred to as (meth)acrylic acid. Acrylic acid ester and methacrylic acid ester are collectively referred to as (meth)acrylic acid ester. Furthermore, introduction of amide groups or amino groups into acrylamide resin enables hydrophilicity and/or water-solubility to be imparted to the resin.

Any of these binders may be used alone. Alternatively, two or more kinds of the binders may be used in combination. Among the binders described above, a saponified product of acrylic resin or vinyl acetate resin (for example, PVA or modified PVA), or rubber-like polymer such as SBR can be used. Since the saponified product of vinyl acetate resin has high hydrophilicity or water solubility, such a product has high affinity and high film formation property with respect to the color developing material and the base material layer 70. Therefore, the transparency can be easily increased. In addition, by using the acrylic resin or the rubber-like polymer, the high transparency is secured and moreover, the binding property is increased easily.

The binder is contained by, for example, 10 to 70 parts by mass, preferably 20 to 65 parts by mass, and more preferably 35 to 60 parts by mass relative to 100 parts by mass of the color developing material. Note that the binder is not an essential component of the heat-sensitive layer 40 and may be used if necessary.

The heat-sensitive layer 40 may further contain a filler. Examples of the filler include an inorganic filler and an organic filler (various resin particles of styrene resin such as polystyrene (PS), olefin resin such as polyethylene (PE), acrylic resin such as polymethyl methacrylate (PMMA), urea resin, or the like). The resin particle may be a hollow resin particle (or resin microcapsule). Examples of the inorganic filler include mineral fillers (such as activated clay, kaolin such as kaolinite, calcined kaolin, talc, clay, and diatomaceous earth), silicon containing compounds (silicon oxide such as white carbon or silica gel, and silicate such as aluminum silicate), and metal compounds (metal oxide such as magnesium oxide, aluminum oxide, titanium oxide, and zinc oxide, metal hydroxide such as magnesium hydroxide and aluminum hydroxide, and metal inorganic acid salts such as magnesium carbonate, calcium carbonate, and barium sulfate). Any of these fillers may be used alone, or two or more kinds thereof may be used in combination. The filler is contained by, for example, 5 to 40 parts by mass, preferably 15 to 30 parts by mass relative to 100 parts by mass of the color developing material.

The heat-sensitive layer 40 may further contain the lubricant. Examples of the lubricant include wax (for example, ester wax such as paraffin wax and carnauba wax and polyolefin wax such as polyethylene wax), oils and fats (higher fatty acids such as oleic acid, higher fatty acid salts (metal soap such as zinc stearate), animal oils and fats such as whale oil, and vegetable oils and fats), and silicone oil. Any of these lubricants may be used alone, or two or more kinds thereof may be used in combination. The lubricant is contained by, for example, 1 to 40 parts by mass, preferably 5 to 35 parts by mass, and more preferably 10 to 30 parts by mass relative to 100 parts by mass of the color developing material.

In a case where the heat-sensitive layer 40 includes the binder, the filler, and the lubricant in a particulate form, the particles preferably have small particle diameters in order to suppress the diffused reflection, in a manner similar to the case of the color developing material. The average particle diameter of these particles is, for example, 1 μm or less, preferably 0.5 μm or less, and more preferably 0.4 μm or less. The average particle diameter is preferably smaller. The lower limit of the average particle diameter is, for example, 0.01 μm or more.

Among the binder, the filler, the lubricant, and the like in the heat-sensitive layer 40, the material that melts at relatively low temperature melts in a step of forming the heat-sensitive layer 40, a step of forming the intermediate layer 30, a step of making the color developing material develop a color, or the like. Such a material enters a space formed between the particles in the heat-sensitive layer 40, or a space formed at an interface of the base material layer 70 and the heat-sensitive layer 40. Thus, the unevenness between the particles and at the interface is reduced. As a result, the diffused reflection in the heat-sensitive layer 40 and moreover in the packaging sheet is suppressed and the transparency can therefore be improved. In this manner, the component that forms the heat-sensitive layer 40 and suppresses the diffused reflection is referred to as a first diffused reflection suppression component. As described above, the components having other functions, such as the binder, the filler, the lubricant, and the like may function as the first diffused reflection suppression component. Alternatively, a component contained in the heat-sensitive layer 40 separately from those components may function as the first diffused reflection suppression component.

The first diffused reflection suppression component preferably melts at lower temperature than the color developing temperature of the color developing material and the temperature where the layers including the heat-sensitive layer 40 are formed. Examples of the organic material functioning as the first diffused reflection suppression component include resin such as polyethylene serving as the binder, the organic filler, and wax and oils and fats. Any one kind of the first diffused reflection suppression components may be used alone or two or more kinds thereof may be used in combination.

The first diffused reflection suppression component to be used is more preferably wax and oils and fats, particularly preferably paraffin (paraffin wax). The melting point of the first diffused reflection suppression component is preferably lower than the color developing temperature of the color developing material. If the first diffused reflection suppression component as above is used, the first diffused reflection suppression component melts at least when the packaging sheet is thermally printed. Thus, the diffused reflection in the packaging sheet can be suppressed effectively. More preferably, the melting point of the first diffused reflection suppression component is lower than the temperature where the layers including the heat-sensitive layer 40 are formed. If the melting point is lower than the temperature where these layers are formed, the first diffused reflection suppression component melts when these layers are formed. Thus, the diffused reflection in the packaging sheet can be effectively suppressed. In addition, the high transparency is achieved even before the color developing material develops the color.

In order to achieve the above effect, the melting point of the first diffused reflection suppression component is, for example, less than 80° C., preferably 65° C. or less, and more preferably 50° C. or less. The lower limit of the melting point of the first diffused reflection suppression component is not limited to a particular temperature. The lower-limit temperature is, for example, 35° C. or more. If the melting point of the first diffused reflection suppression component is in this range, it is easy to melt the first diffused reflection suppression component in a process of manufacturing the packaging sheet, a process of manufacturing a packaging container from the packaging sheet, or a process of thermal printing. Therefore, the first diffused reflection suppression component as above is advantageous in suppressing the diffused reflection.

The first diffused reflection suppression component preferably has a particulate shape before the first diffused reflection suppression component is melted in the heat-sensitive layer 40. The average diameter of the first diffused reflection suppression component is, for example, 1 μm or less, preferably 0.05 to 0.5 μm, and more preferably 0.1 to 0.4 μm. When the average particle diameter is in this range, the first diffused reflection suppression component is dispersed in the heat-sensitive layer 40 easily. Therefore, when the first diffused reflection suppression component is melted, it is easy to melt this component relatively uniformly. Even in a case where the first diffused reflection suppression component does not melt but remains in a particulate form in the heat-sensitive layer 40, the diffused reflection is easily suppressed.

The first diffused reflection suppression component is contained by, for example, 1 to 40 parts by mass, preferably 5 to 35 parts by mass, and more preferably 10 to 30 parts by mass relative to 100 parts by mass of the color developing material. When the first diffused reflection suppression component is contained in this range, it is possible to effectively suppress the diffused reflection in the heat-sensitive recording sheet, particularly the heat-sensitive layer 40 or at the interface between the heat-sensitive layer 40 and the base material layer 70 without deteriorating the clarity of the thermal printing.

When each component of the heat-sensitive layer 40 is dispersed in the dispersion medium, a known mixer or a known pulverizer such as a sand mill or a bead mill may be used. In a case of using the organic solvent such as alcohol, ketone, or nitrile as the dispersion medium, the lamination by the printing as above becomes possible. If water or an aqueous solution is used as the dispersion medium, the dispersion medium is applied on a front surface of the base material layer 70 and the applied film is dried; thus, the heat-sensitive layer 40 is formed.

The drying of the applied film may be performed under atmospheric pressure or reduced pressure. The temperature of a laminated body including the applied film formed in the drying may be controlled to be higher than the melting point of the first diffused reflection suppression component. This control can melt the first diffused reflection suppression component, and therefore, the diffused reflection can be suppressed effectively. On the other hand, in order to prevent the heat-sensitive layer 40 from reacting with heat, it is necessary to control the temperature of the laminated body including the applied film so as not to become too high. From this perspective, the temperature can be selected as appropriate from the range of 25 to 100° C. More specifically, this temperature is preferably set to 50 to 100° C., more preferably 80 to 100° C.

The dry mass of the heat-sensitive layer 40 per unit area is, for example, 1 to 10 g/m$^2$, preferably 2 to 6 g/m$^2$. When the mass of the heat-sensitive layer 40 is in this range, the thickness of the heat-sensitive layer 40 can be set in the appropriate range. Therefore, both the printing property and the transparency can be easily achieved.

(Heat Seal Layer)

The heat seal layer 10 is formed by stacking films of LDPE (low-density polyethylene) used as a sealant. By heating the heat seal layers 10 in a state of being closely attached together, the heat seal layers 10 can be thermally welded to each other. By using this property, the packaging sheet that is formed to have a bag-like shape is heated in a similar state; thus, sealing, that is, heat-sealing can be performed. Therefore, the material of the heat seal layer 10 is not limited to LDPE and may be any material capable of heat sealing, that is, having a heat sealing property. Preferable examples of such a material include films of HDPE (high-density polyethylene), CPP (cast polypropylene), OPP (oriented polypropylene), and EVA (ethylene vinyl acetate copolymer). Other examples include polyolefin resin such as polyethylene or polypropylene, vinyl acetate resin such as ethylene-vinyl acetate copolymer (such as olefin-vinyl acetate copolymer), ethylene-(meth)acrylate copolymer, acrylic resin such as ionomer (for example, olefin-(meth) acrylate copolymer or a metal crosslinking substance thereof), and the like. These materials may be formed by using a known adhesive with a heat-sealing property. It is preferable to use a member that becomes transparent after formation. From the perspectives of the transparency, the sealing strength, and the like, the heat seal layer 10 has a thickness of preferably 5 to 50 μm, more preferably 10 to 30 μm.

(Intermediate Layer)

The intermediate layer 30 is provided to protect the heat-sensitive layer 40 and the like from the deterioration from the back surface side, and moreover to improve the transparency of the packaging sheet. For such purposes, the intermediate layer includes BARIASTAR (product name) manufactured by Mitsui Chemicals, Inc., which is a core-shell type particle including acrylic resin such as acrylic amide resin. This particle mainly contains a core-shell type particle. In the core-shell type particle, a core part is formed of hydrophobic resin and a shell part is formed of hydrophilic resin or water-soluble resin.

The hydrophilic resin or the water-soluble resin has high film-formation property and easily penetrates into the heat-sensitive layer 40 that is hydrophilic when the intermediate layer 30 is formed on the heat-sensitive layer. Therefore, the hydrophilic resin or the water-soluble resin easily forms the intermediate layer 30 that is flat. When the intermediate layer 30 that is flat is formed, the diffused reflection in the heat-sensitive layer and the intermediate layer 30, at the interface between the both, and the like is suppressed. Thus, the transparency of the packaging sheet can be increased further. Such hydrophilic resin or water-soluble resin functions as a second diffused reflection suppression component to suppress the diffused reflection in the packaging sheet. On the other hand, the core part that is hydrophobic does not penetrate into the heat-sensitive layer 40 but remains in the intermediate layer 30, and therefore suppresses the penetration of the aqueous solution from the back surface side.

Preferable examples of the hydrophilic resin or the water-soluble resin that is used for the shell part include, in addition to the above, a saponified product of the vinyl acetate resin such as PVA, and acrylic resin (particularly, acrylic resin in which a hydrophilic group such as a carboxyl group, an acid anhydride group, an amino group, or an amide group is introduced). A saponified product of the vinyl acetate resin, particularly a saponified product with a high saponification degree such as PVA includes a number of hydroxyl groups. Therefore, such resin has high hydrophilicity or water solubility.

The hydrophobic resin material used for the core part is not limited to a particular material and, in addition to the above material, a saponified product of acrylic resin or vinyl acetate resin (such as PVA or modified PVA) and rubber-like polymer such as SBR can be used. Using the acrylic resin, the rubber-like polymer, or the like can increase the water resistance of the packaging sheet. If the penetration of the aqueous solution from the back surface side does not lead to a problem in particular, the materials described as the examples of the hydrophilic resin or the water-soluble resin used for the shell part can be selected as appropriate. In this case, it is not particularly necessary to use the core-shell type particle. Only the hydrophilic resin or the water-soluble resin used for the shell part may be used alone.

The intermediate layer 30 can be formed by applying a coating liquid containing resin to a front surface of the heat-sensitive layer and drying the applied film. The coating liquid is, for example, a dispersion liquid or in the form of emulsion. Examples of a dispersion medium used in the coating liquid include a dispersant described as an example in regard to the heat-sensitive layer. The coating liquid may contain a surfactant or the like if necessary. If the resin includes water-soluble resin or hydrophilic resin, the water-soluble resin or the hydrophilic resin can penetrate into the heat-sensitive layer when the applied film is dried. The drying condition is not limited to a particular condition if the dispersion medium in the coating liquid can be removed. This drying condition may be the same as the drying condition when the heat-sensitive layer is formed.

When the dry mass of the intermediate layer 30 per unit area is, for example, 0.1 to 5 g/m$^2$, preferably 0.5 to 3 g/m$^2$, the barrier property can be secured while the transparency is secured.

(Protective Layer)

The protective layer 20 is provided to protect the intermediate layer 30, the heat-sensitive layer 40, and the like from the deterioration from the back surface side, and to increase the adhesion between the intermediate layer 30 and the heat seal layer 10.

The protective layer 20 is formed of colloidal silica as the filler and zinc stearate as the lubricant by using acrylic resin as the binder.

The colloidal silica used as the filler is a colloid of silicon oxide or a hydrate thereof and has high transparency. In addition, by reducing the particle diameter of the colloidal silica, the diffused reflection can be suppressed; therefore, the transparency of the protective layer 20 can be improved.

The average particle diameter of the colloidal silica is, for example, 500 nm or less, preferably 400 nm or less, and more preferably 300 nm or less and 1 nm or more from the viewpoint of suppressing the diffused reflection. In order to both suppress the diffused reflection and maintain the strength after the film formation, a plurality of particle groups with different particle size distributions may be used in combination. For example, colloidal silica with an average particle diameter of 1 nm or more and less than 20 nm, and colloidal silica with an average particle diameter of 20 to 500 nm, preferably 20 to 100 nm, may be used in combination. By using a small particle group and a large particle group in combination, the diffused reflection can be suppressed easily while the strength of the protective layer 20 is maintained.

The colloidal silica is contained in the protective layer 20 by preferably 10 to 65 mass %, preferably 10 to 60 mass %, more preferably 10 to 50 mass %, and particularly preferably 25 to 50 mass %. By controlling the amount of colloidal silica in the above range, the diffused reflection can be suppressed while the strength of the protective layer 20 is maintained.

The filler may be, instead of the colloidal silica, the inorganic filler or the organic filler (various resin particles of styrene resin such as polystyrene (PS), olefin resin such as polyethylene (PE), acrylic resin such as polymethyl methacrylate (PMMA), urea resin, or the like), for example. The resin particle may be a hollow resin particle (or resin microcapsule). Examples of the inorganic filler include mineral fillers (such as activated clay, kaolin such as kaolinite, calcined kaolin, talc, clay, and diatomaceous earth), silicon containing compounds (such as white carbon, silicon oxide such as silica gel, and silicate such as aluminum silicate), and metal compounds (metal oxide such as magnesium oxide, aluminum oxide, titanium oxide, and zinc oxide, metal hydroxide such as magnesium hydroxide and aluminum hydroxide, and metal inorganic acid salts such as magnesium carbonate, calcium carbonate, and barium sulfate). Any of these fillers may be used alone, or two or more kinds thereof may be used in combination. These fillers may be used in combination with the colloidal silica.

The lubricant may be, instead of zinc stearate, wax (for example, ester wax such as paraffin wax and carnauba wax, and polyolefin wax such as polyethylene wax), oils and fats (higher fatty acids such as oleic acid, higher fatty acid salts (metal soap such as zinc stearate), animal oils and fats such as whale oil, and vegetable oils and fats), and silicone oil. Any of these lubricants may be used alone, or two or more kinds thereof may be used in combination. These lubricants may be used in combination with zinc stearate.

The acrylic resin as the binder is contained by, for example, 10 to 70 mass %, preferably 20 to 60 mass %, and more preferably 25 to 50 mass %. In addition, the acrylic resin is contained by, for example, 50 to 500 parts by mass, preferably 80 to 200 parts by mass relative to 100 parts by mass of the colloidal silica.

Instead of the acrylic resin, thermosetting resin such as epoxy resin or phenolic resin may be used. The thermosetting resin may be self-crosslinkable thermosetting resin or a composition containing base resin and a crosslinking agent. Examples of such a composition include a composition including acrylic resin with a carboxyl group such as polyacrylic acid and a crosslinking agent of the carboxyl group. The crosslinking agent may be a known crosslinking agent such as ammonium zirconium carbonate in accordance with the kind of a functional group in the base resin. If necessary, the thermosetting resin may include a curing agent or a curing accelerator, for example. Any one kind of the binders may be used alone or two or more kinds thereof may be used in combination. In addition, these binders may be used in combination with the acrylic resin.

The protective layer 20 can be formed by applying a coating liquid having the above components dispersed in a dispersion medium for lamination, and drying the applied film. The dispersion medium may be the organic solvent such as alcohol, ketone, and/or nitrile, and is preferably water. In the dispersion, the mixture is stirred using a known mixer, a known pulverizer such as a sand mill or a bead mill, or a hand. The drying condition is not limited to a particular condition if the dispersion medium in the coating liquid can be removed, and the drying may be performed either under atmospheric pressure or reduced pressure.

The dry mass of the protective layer 20 per unit area is preferably 0.1 to 5 g/m$^2$, more preferably 0.5 to 2.5 g/m$^2$, from the perspective of securing the transparency and the proper strength of the packaging sheet.

(Printing Layer)

The printing layer 60 is formed by gravure printing, offset printing, rotary letterpress printing, UV printing, silk screen printing, or the like. The printing layer 60 is not an essential component. However, by providing the printing layer 60, it is possible to display a product name, a manufacturer name, ingredients, and the like before the product is packaged and to add the excellent design to the product. If the dispersion medium of the heat-sensitive layer 40 is the organic solvent and can be formed by printing, the printing layer 60 can be formed at the same time as the heat-sensitive layer 40.

The printing layer 60 is provided to a part of the base material layer 70 on the back surface side. Therefore, in the case where the contents are packaged with the packaging sheet, it is easy to see the contents from the portion where the printing layer 60 is not provided. Alternatively, by thermally printing on the portion where the printing layer 60 is not provided, the thermally printed information can be clearly seen regardless of the printed information.

(Undercoat Layer)

The undercoat layer 50 is provided in order to increase the adhesion between the base material layer 70 or the printing layer 60 and the heat-sensitive layer 40. Such an undercoat layer is formed using the binder or the filler as a main component. As the binder and the filler, the materials described as the examples of the binder and the filler for the heat-sensitive layer 40 can be used.

2. Manufacturing Method

The packaging sheet is formed as below.

(1) Formation of Base Material Layer 70 to Heat-Sensitive Layer 40

The printing layer 60 is formed by gravure printing on a part of a back surface of a 40-μm-thick OPP film as the base material layer 70. Subsequently, the binder such as SBR (styrene butadiene rubber, Tg −3° C.) is similarly printed; thus, the undercoat layer 50 is formed. In addition, a heat-sensitive liquid in which the color developing material, the binder, the filler, and paraffin as the first diffused reflection suppression component are dispersed in the organic solvent is printed similarly; thus, the heat-sensitive layer 40 is formed. That is to say, the layers ranging from the printing layer 60 to the heat-sensitive layer 40 are formed in one step on the back surface side of the base material layer 70 through multilayer printing.

(2) Formation of Intermediate Layer 30

Core-shell type acrylic resin as the first diffused reflection suppression component is dispersed in an appropriate amount of water and the mixture is applied on the entire front surface of the heat-sensitive layer 40 and then dried. Thus, the intermediate layer 30 is formed.

(3) Formation of Protective Layer 20

In an appropriate amount of water, 15 parts by mass of colloidal silica with a particle diameter of several nanometers, 30 parts by mass of colloidal silica with a particle diameter of several tens of nanometers, 10 parts by mass of PE particles (average particle diameter: 0.12 μm), 5 parts by mass of zinc stearate (average particle diameter: 5.5 μm), and the binder (50 parts by mass of acrylic resin (polyacrylic acid) and 5 parts by mass of ammonium zirconium carbonate as the crosslinking agent) are dispersed. This mixture is applied to the entire front surface of the intermediate layer 30, and dried. Thus, the protective layer 20 is formed.

(4) Formation of Heat Seal Layer

A non-oriented polypropylene film (thickness: 20 μm) with a heat sealing property is welded to the protective layer 20; thus, the heat seal layer 10 is formed.

Thus, the packaging sheet is formed.

(5) Inspection

The thermal printing property, the transparency, etc. of the obtained packaging sheet are inspected. Items to be inspected, an inspecting method, and criteria are determined arbitrarily in accordance with the intended purpose. For example, in order to see the contents after the packaging, it is preferable that, in a state that the heat-sensitive layer 40 does not develop a color, the opacity based on JIS P8138 is 25% or less. The opacity is more preferably 20% or less. The opacity can be measured by, for example, a commercial reflectometer. Note that JIS P8138 is the standard for measuring the opacity of paper. The opacity is measured in a region on the packaging sheet where the heat-sensitive layer is formed. In a case where the packaging sheet includes the printing layer, the opacity can be measured in other region than the printing layer.

According to the embodiment described above, the following effects can be obtained.

(1) The packaging sheet according to the present embodiment includes the printing layer 60; thus, the packaging sheet can have the excellent design. Moreover, since the printing layer 60 is formed on the back surface side of the base material layer 70, the front surface side of the printing layer 60 is protected by the base material layer 70. Accordingly, even if the front surface side of the packaging sheet is rubbed with another packaging sheet or the like, the printed information is not damaged. In addition, since the packaging sheet has high transparency, the printed information can be clearly seen from the front surface side.

(2) The printing layer 60 is provided to a part of the base material layer 70 on the back surface side. Therefore, in the case where the contents are packaged with the packaging sheet, the contents can be seen from the portion where the printing layer 60 is not provided. Alternatively, by thermally printing on the portion where the printing layer 60 is not provided, the thermally printed information can be clearly seen regardless of the printed information.

(3) The packaging sheet in the present embodiment includes the core-shell type particle including the shell part that functions as the second diffused reflection suppression component. Therefore, the hydrophilic resin or the water-soluble resin in the shell can penetrate into the heat-sensitive layer 40. As a result, the effect of suppressing the diffused reflection in the packaging sheet can be increased further.

(4) In the packaging sheet according to the present embodiment, the color developing material is dispersed in the organic solvent. Therefore, for example, the heat-sensitive layer 40 can be formed by a general printing technique such as gravure printing. In the case where the printing layer 60 is provided, the printing layer 60 and the heat-sensitive layer 40 can be formed in one step.

(5) The packaging sheet according to the present embodiment includes the intermediate layer 30 in contact with the heat-sensitive layer 40. The intermediate layer 30 includes the hydrophilic resin or the water-soluble resin that functions as the second diffused reflection suppression component for suppressing the diffused reflection. Therefore, it becomes easy to protect the heat-sensitive layer from the penetration of oily substances. The intermediate layer 30 functions as the second diffused reflection suppression component for suppressing the diffused reflection. Accordingly, the deterioration in transparency of the packaging sheet due to the diffused reflection is suppressed also in the intermediate layer 30 and therefore, the transparency of the packaging sheet can be improved further.

(6) The packaging sheet in the present embodiment includes paraffin as the low-melting-point material that functions as the first diffused reflection suppression component. There are various kinds of paraffin melting at various temperatures. Since paraffin has a melting point, paraffin melts easily at least when the heat-sensitive layer develops the color. Therefore, the diffused reflection can be suppressed more easily.

(7) The first diffused reflection suppression component included in the heat-sensitive layer 40 of the packaging sheet in the present embodiment includes the low-melting-point material that has the lower melting point than the color developing temperature of the color developing material. Therefore, at least when the heat-sensitive layer 40 develops the color, the first diffused reflection suppression component melts and fills the space in the heat-sensitive layer 40, so that the diffused reflection in the heat-sensitive layer 40 can be suppressed.

(8) The heat-sensitive layer 40 in the packaging sheet in the present embodiment includes the first diffused reflection suppression component. Therefore, since the diffused reflection in the heat-sensitive layer 40 is suppressed, the transparency of the packaging sheet can be improved.

(9) In the packaging sheet according to the present invention, in a state before the heat-sensitive layer 40 develops the color, the opacity based on JIS P8138 is 25% or less. Thus, this packaging sheet is excellent in transparency. Therefore, when the contents such as a product or merchandise are packaged, the concealment of the contents can be reduced.

(10) The packaging sheet according to the present invention includes the heat-sensitive layer 40 including the color developing material that develops the color by heating. Therefore, the thermal printing at an arbitrary timing is possible. Therefore, after the product is packaged, the information of the product can be displayed by thermal printing on the packaging container without using a separate member such as a label.

(11) In the packaging sheet according to the present invention, the base material layer 70 is more on the front side than the heat-sensitive layer 40. Therefore, the heat-sensitive layer 40 can be protected sufficiently from friction or the like. Specifically, the friction will not make the thermally printed information by the developed color disappear or the heat-sensitive layer 40 develop a color.

The above embodiment may be changed as below.

In the above embodiment, the packaging sheet includes the protective layer 20. The protective layer 20 protects the layers stacked on the front surface side and improves the adhesion with the heat seal layer 10. However, the protective layer 20 is not an essential component. In a case where the adhesion between the heat seal layer 10 and the intermediate layer 30 is not a problem, or in a case where the penetration of gas or liquid from the back surface side does not lead to a problem, the protective layer 20 may be omitted.

In addition, the protective layer 20 may be provided at an arbitrary position between the heat-sensitive layer 40 and the base material layer 70. The penetration of gas or liquid from the front surface side can be suppressed.

In the above embodiment, the packaging sheet includes the intermediate layer 30. The intermediate layer 30 protects the heat-sensitive layer 40 and improves the transparency of the packaging sheet. However, the intermediate layer 30 is not an essential component. In a case where the penetration of gas or liquid from the back surface side does not lead to a problem and in a case where the transparency is enough although the intermediate layer 30 is absent, the intermediate layer 30 may be omitted.

The intermediate layer 30 may be provided at an arbitrary position between the heat-sensitive layer 40 and the base material layer 70. It is possible to suppress the penetration of gas or liquid from the front surface side.

In the above embodiment, the heat-sensitive layer 40 may be provided to the entire surface of the packaging sheet; however, the heat-sensitive layer 40 may be provided partially. For example, by providing the heat-sensitive layer 40 only to the portion where the printing layer 60 is not provided, the printed portion and the thermally printed portion may be provided. Furthermore, in a structure where the heat-sensitive layer 40 is not provided in an axial-direction welding part and its vicinity or an end welding part and its vicinity, it is possible to prevent, when such parts are thermally welded, those parts from developing the color.

In the above embodiment, the packaging sheet includes the undercoat layer 50 in order to increase the adhesion between the base material layer 70 or the printing layer 60 and the heat-sensitive layer 40. However, the undercoat layer 50 is not an essential component. If the adhesion between the base material layer 70 or the printing layer 60 and the heat-sensitive layer 40 does not lead to a problem, the undercoat layer 50 may be omitted. The undercoat layer 50 can be omitted also when the protective layer 20 is provided at an arbitrary position between the heat-sensitive layer 40 and the base material layer 70 and this protective layer 20 can replace the function of the undercoat layer 50.

The undercoat layer 50 may be provided at an arbitrary position between the heat-sensitive layer 40 and the base material layer 70. In particular, when the protective layer 20 is not provided between the heat seal layer 10 and the heat-sensitive layer 40 and the undercoat layer 50 is provided in contact with the front surface side of the heat seal layer 10, the adhesion with the layer on the front surface side can be increased further.

In the present embodiment, the printing layer 60 is provided in order to add a display of a product name, a manufacturer name, ingredients, and the like to the packaging sheet before the product is packaged or to improve the design of the product. However, the printing layer 6 is not an essential component and may be omitted if unnecessary.

The printing layer 60 is provided to a part of the base material layer 70 on the back surface side. However, if it is unnecessary to see the contents, the printing layer 60 may be provided to the entire surface. Even when the printing layer 60 is provided to the entire surface, printing with transparency makes it possible to see the contents.

Figure 1B:
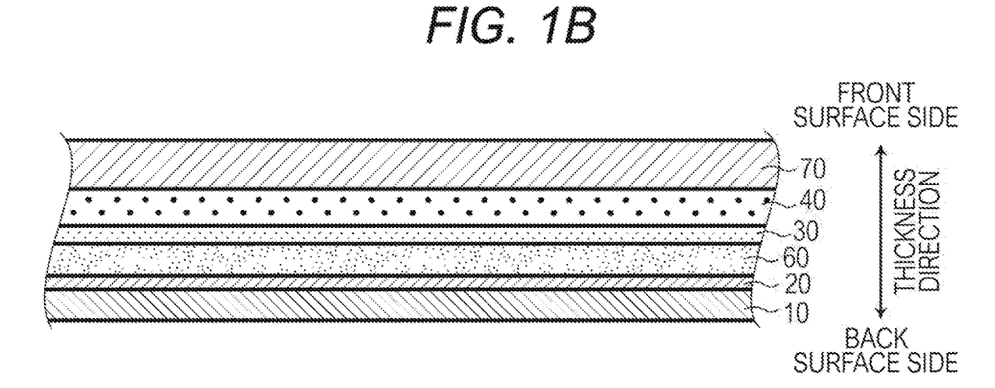

The printing layer 60 may be provided at an arbitrary position between the heat-sensitive layer 40 and the heat seal layer 10, for example, as shown in FIG. 1B. Since the packaging sheet according to the present embodiment has high transparency, the printed information can be seen from the front surface side no matter where the printing layer 60 is provided. For example, in a case where the printing layer 60 is provided more on the back surface side than the heat-sensitive layer 40 and the background or the like is printed on the printing layer 60 and text information is printed on the heat-sensitive layer 40, the background and the text information can be recognized at the same time.

The packaging sheet may further include a layer that is not described in the above embodiment. For example, an adhesive layer may be provided between the layers if necessary.

Second Embodiment

A packaging container according to a second embodiment to which the packaging container according to the present invention is applied is described with reference to FIG. 2A, FIG. 2B and FIG. 3. In the following description, a direction and an orientation refer to the direction and the orientation shown in the drawings.

Since the packaging container according to the present embodiment is formed using the packaging sheet according to the first embodiment, the description of the packaging sheet is omitted.

Figure 2A:
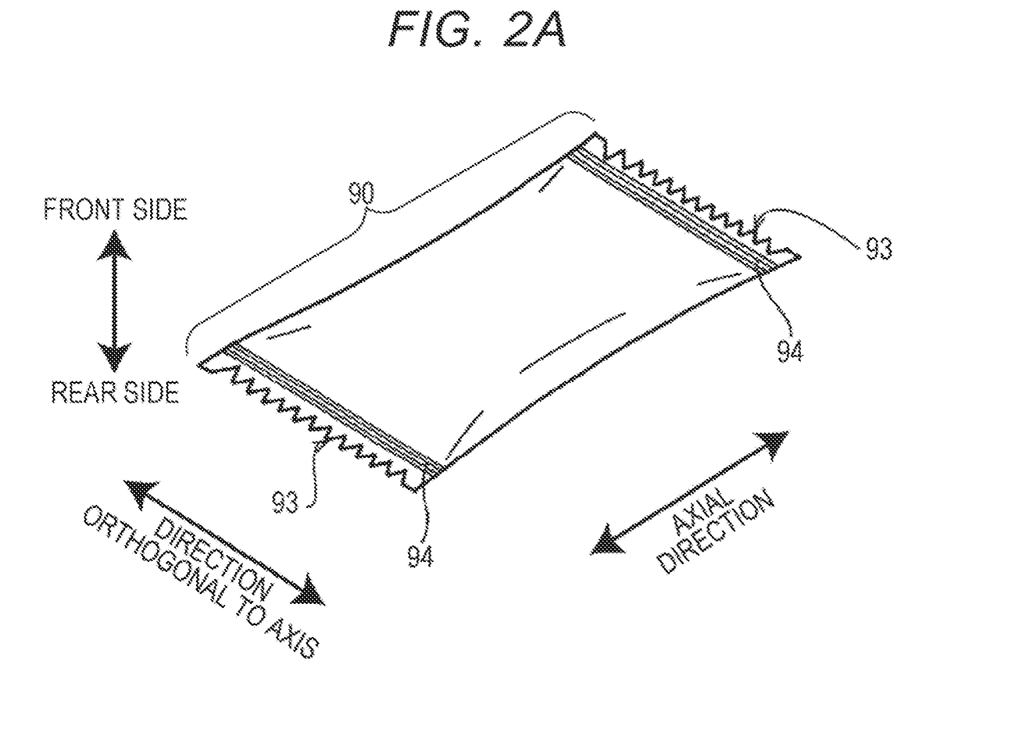
FIG. 2A illustrates the packaging container viewed from the front side and FIG. 2B illustrates the packaging container viewed from the rear side.
Figure 2B:
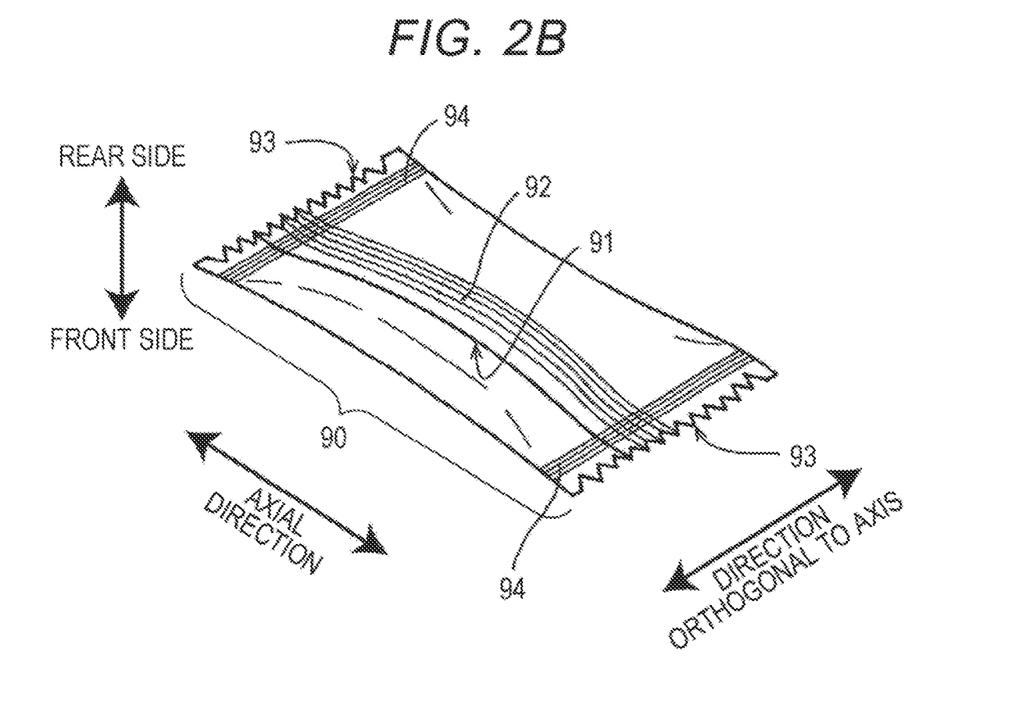

FIG. 2A and FIG. 2B are schematic perspective views of the packaging container; FIG. 2A illustrates the packaging container viewed from the front side and FIG. 2B illustrates the packaging container viewed from the rear side. As illustrated in FIG. 2A and FIG. 2B, the packaging container according to the present embodiment includes a cylindrical part 90 and an axial-direction welding part 92 with a band-like shape. The cylindrical part 90 is formed by bending, in a cylindrical shape, the packaging sheet according to the first embodiment with a rectangular or band-like shape. The axial-direction welding part 92 is formed to extend in an axial direction by thermally welding the heat seal layer 10 on one end 91 and the heat seal layer 10 on the other end 91, the heat seal layers facing each other in a direction orthogonal to the axis of the cylindrical part 90. In addition, end welding parts 94 with a band-like shape are provided. The end welding part 94 is formed to extend in the direction orthogonal to the axis by thermally welding the heat seal layers 10 at ends 93 of the cylindrical part 90 in the axial direction to each other.

Since this packaging container is a packaging bag formed of the packaging sheet according to the present invention, the packaging container has a function similar to that of the packaging sheet according to the first embodiment. That is to say, since the heat-sensitive layer 40 is provided, the thermal printing is possible either at an arbitrary timing in the packaging step or after the formation of the container and additionally, the thermally printed information will not disappear due to the friction. Moreover, since the container has high transparency, the contents can be seen without opening the container. This packaging container can be easily manufactured by thermally welding the heat seal layers 10 to each other.

The packaging container according to the present embodiment is a pillow packaging container manufactured by pillow packaging that packages the contents. In the pillow packaging, a wound packaging sheet is formed into a bag, the bag is filled with the contents, and the filled bag is heat-sealed; thus, a packaging container continuous body as illustrated in FIG. 3 is obtained. Further, this body is cut along a cut line 95 and discharged. This pillow packaging is a packaging method that can be used for general purposes, and has been widely employed mainly in the food packaging regardless of the scale.

The packaging container according to the present embodiment described above employs the packaging sheet according to the first embodiment; thus, the effects (1) to (11) in the first embodiment can be entirely obtained. In addition to those above, the following effects can also be obtained.

(12) The packaging container according to the present embodiment is a pillow packaging container; therefore, the packaging container is formed by a general-purpose and small-scaled packaging device. Therefore, the packaging container according to the present invention is used for general purposes and inexpensive.

(13) The packaging sheet according to the first embodiment includes the heat seal layer 10. Therefore, by thermally welding the heat seal layers 10 to each other, the packaging container according to the present embodiment can be easily manufactured.

The embodiment described above may be changed as below.

Figure 3:
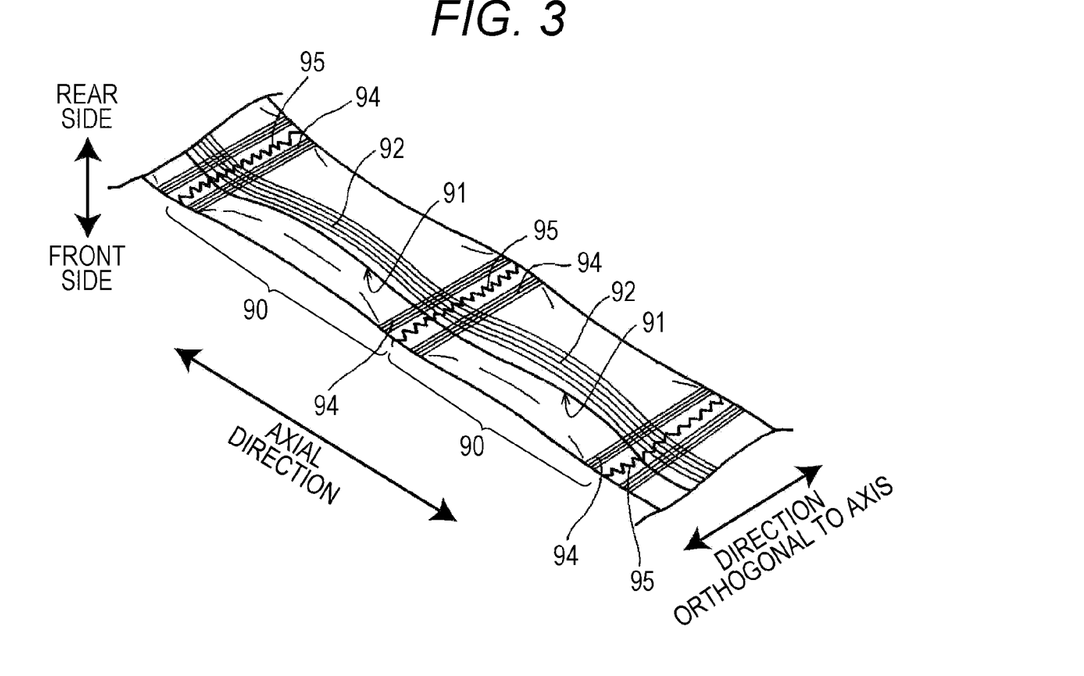
FIG. 3 is a perspective view of a modification of the packaging container according to the second embodiment of the present invention.

The packaging container is formed one by one in the above embodiment; however, the packaging container may be continuous as illustrated in FIG. 3. In particular, in a case of a small lot of packaging containers, the containers are preferably formed as a continuous body to facilitate the display. In the case of the continuous body, the cut line 95 to cut the body into pieces may be formed by perforation or half-cutting so that a customer can cut as necessary.

In the packaging container according to the present embodiment, the end 93 is formed by a wavy line so that a customer can easily tear the container open. If not particularly necessary, the end 93 may be linear.

The packaging container in the above embodiment is the pillow packaging container; however, the packaging container may be another packaging container such as a box-shaped container. The packaging container may have an individual bag-like shape by using a rectangular packaging sheet.

The packaging container in the above embodiment has high transparency; however, if it is unnecessary to see the contents, the container does not need to be transparent. For example, by providing the printing layer 60 on the entire surface, the necessary printing may be provided on the entire surface.

The packaging container in the above embodiment covers the contents by using one packaging sheet; however, a plurality of packaging sheets may be used. For example, the contents may be held between two of the same type of packaging sheets and the peripheral parts of the two packaging sheets may be thermally welded to form the packaging container. Alternatively, three or more packaging sheets may be used to form a polyhedral container. The selection can be performed in accordance with the purpose.

Third Embodiment

Figure 4:
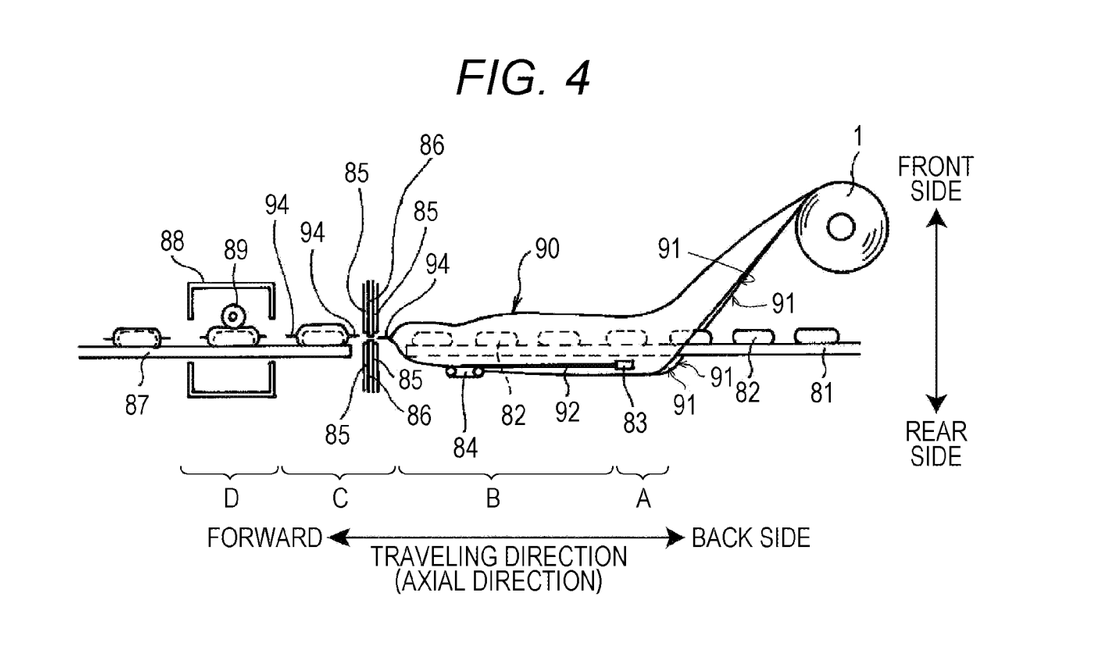
FIG. 4 is a schematic view for describing a packaging method according to a third embodiment of the present invention.

A packaging method according to a third embodiment to which a packaging method according to the present invention is applied is described with reference to FIG. 4. In the following description, a direction and an orientation refer to the direction and the orientation shown in the drawing.

The packaging method according to the present embodiment is a packaging method for packaging the contents with the packaging sheet according to the first embodiment. FIG. 4 is a diagram for describing the packaging method by normal pillow packaging using a lateral pillow packaging machine. As illustrated in FIG. 4, the packaging method according to the present embodiment includes: a bending step A of bending a packaging sheet with a band-like shape into a cylindrical shape; an axial-direction welding part formation step B of forming the axial-direction welding part 92; an end welding part formation step C of forming the end welding part 94 and forming a bag-like packaging container; and a thermal printing step D of thermally printing the packaging container. The steps are performed successively by the lateral pillow packaging machine, and some steps are performed in an overlapped manner. The steps are described in detail with reference to the drawing.

The packaging sheet is supplied forward in a traveling direction (hereinafter simply referred to as "forward") from a roll 1 where a band-shaped packaging sheet is wound. The packaging sheet is bent as the sheet goes forward. As the packaging sheet is bent, both the ends 91 that are orthogonal to the traveling direction are overlapped so that the heat seal layers 10 are in contact with each other. This step corresponds to the bending step A. By this bending step, the cylindrical part 90 is formed. Here, inside the cylindrical part 90, contents 82 loaded at predetermined intervals on an upper surface side of a first belt conveyer 81 are inserted in order. Note that the axial direction of the cylindrical part 90 coincides with the traveling direction.

In the next axial-direction welding part formation step B, a first heat sealer 83 is pressed on the ends 91 that are overlapped. By this pressing, the both ends 91 are thermally welded continuously forward from the back side in the traveling direction (hereinafter simply referred to as "back side"). Thus, the axial-direction welding part 92 is formed continuously forward from the back side. The axial-direction welding part 92 that is formed is pressed to the upper surface side from the lower surface side by a pressing belt 84. Thus, the axial-direction welding part 92 is bent along a rear surface of the cylindrical part.

In the next end welding part formation step C, second heat sealers 85 that are provided to extend in the direction orthogonal to the traveling direction hold the cylindrical part 90 therebetween from the front side and the rear side, and heat the cylindrical part 90. Thus, the end welding parts 94 that extend in the band-like shape in the direction orthogonal to the traveling direction are formed in the cylindrical part 90. The end welding parts 94 are formed at the cylindrical part 90 for every certain distance in the traveling direction except a portion filled with the contents 82. Note that forming the end welding parts 94 except the portion filled with the contents 82 is possible by synchronizing the first belt conveyer 81 and the second heat sealers 85. This is more accurately possible by providing a sensor (for example, an optical sensor) that is not shown to operate the second heat sealers 85 while checking the presence or absence of the contents 82.

Incidentally, the second heat sealers 85 are provided with a cutter 86 that cuts the cylindrical part 90. Thus, at the same time when the end welding part 94 is formed, the cylindrical part 90 on the forward side is cut off and the packaging container having the contents 82 sealed therein is formed.

The formed packaging container is loaded on the front side of a second belt conveyer 87 and sent to the thermal printing step D. In the thermal printing step D, the thermal printing is performed by heating the heat-sensitive layer 40 of the packaging container with a hot stamp 89 included in a heat-sensitive thermal printing device 88.

According to the present embodiment described above, the following effects can be obtained.

(1) The thermal printing step D is performed after the end of the end welding part formation step C. That is to say, the thermal printing step D is performed after the contents are packaged. Therefore, the information that is difficult to print in advance, such as the date of manufacture, can be written easily without using a separately printed label.

(2) The packaging method is a pillow packaging step. Therefore, by a simple method, the contents can be packaged with the packaging sheet according to the present invention.

Note that the present embodiment may be changed as below.

In the above embodiment, the thermal printing step D is performed after the end welding part formation step C; however, the thermal printing step D may be performed at an arbitrary timing. For example, in a case where the individual thermal printing is unnecessary, for example when the same display is performed in a large quantity, the thermal printing step D is performed before the bending step A. In this case, the stable thermal printing is possible regardless of the shape of the contents 82, for example.

The above embodiment is a packaging method using continuous packaging steps. However, the steps may be performed discontinuously. In general, in small-scale packaging, the steps are preferably discontinuous because the manufacturing apparatus can be smaller.

In the packaging method in the above embodiment, the roll 1 where the band-shaped packaging sheet is wound is used. However, a packaging sheet with a sheet shape typified by a rectangular packaging sheet may be used. In particular, in a case of using the small-scaled and discontinuous packaging method, the rectangular sheet in accordance with the size of the contents 82 is preferably used because the cutting step can be omitted.

In the above embodiment, the hot stamp is used in the thermal printing in view of the structure where the heat-sensitive layer 40 is protected by the base material layer 70. If a sufficient amount of heat can be applied to develop the color, the thermal printing may be performed by a thermal printer. Alternatively, other printing methods including a thermal printing method with a laser beam may be employed to heat and develop the color.

LIST OF REFERENCE NUMERALS

1 Roll
10 Heat seal layer
20 Protective layer
30 Intermediate layer
40 Heat-sensitive layer
50 Undercoat layer
60 Printing layer
70 Base material layer
81 First belt conveyer
82 Contents
83 First heat sealer
84 Pressing belt
85 Second heat sealer
87 Second belt conveyer
88 Heat-sensitive thermal printing device
89 Hot stamp
90 Cylindrical part 91 Ends that face each other in the direction orthogonal to the axis
92 Axial-direction welding part
93 End in the axial direction
94 end welding part
95 Cut line
A Bending step
B Axial-direction welding part formation step
C End welding part formation step
D Thermal printing step

The invention claimed is:

1. A packaging sheet comprising:
a heat seal layer for thermally welding by heating;
a protective layer including a filler, a lubricant and a binder;
an intermediate layer including a core-shell type particle;
a heat-sensitive layer including a color developing material that develops a color by heating; and
a base material layer that secures a strength and protects the heat-sensitive layer, wherein:
the heat seal layer, the protective layer, the intermediate layer, the heat-sensitive layer, and the base material layer are provided in this order from a back surface side in a thickness direction;
the packaging sheet is transparent before the heat-sensitive layer develops the color; and
the packaging sheet further comprises a printing layer on which at least one of an ink or a dye is printed, the printing layer being arranged on the back surface side of at least a part of the base material layer, the printing layer being arranged between the base material layer and the heat-sensitive layer or between the heat-sensitive layer and the heat seal layer.

2. The packaging sheet according to claim 1, wherein before the heat-sensitive layer develops the color, an opacity based on JIS P8138 is 25% or less.

3. The packaging sheet according to claim 1, wherein the heat-sensitive layer includes a first diffused reflection suppression component for suppressing diffused reflection in the heat-sensitive layer.

4. The packaging sheet according to claim 3, wherein the first diffused reflection suppression component includes a low-melting-point material with a melting point lower than a color developing temperature of the color developing material.

5. The packaging sheet according to claim 4, wherein the low-melting-point material includes paraffin.

6. The packaging sheet according to claim 1, wherein:
the intermediate layer includes a diffused reflection suppression component for suppressing diffused reflection in the packaging sheet; and
the diffused reflection suppression component includes hydrophilic resin or water-soluble resin.

7. The packaging sheet according to claim 1, wherein the color developing material is dispersed in an organic solvent.

8. The packaging sheet according to claim 6, wherein the diffused reflection suppression component is the core-shell type particle, and the core-shell type particle includes the hydrophilic resin or the water-soluble resin in a shell.

9. The packaging sheet according to claim 1, wherein the printing layer is formed in contact with the base material layer.

10. A packaging container with a bag-like shape that is formed using the packaging sheet according to claim 1, the packaging container comprising:
a cylindrical part formed by bending in a cylindrical shape, the packaging sheet with a rectangular or band-like shape;
an axial-direction welding part formed to extend in an axial direction by thermally welding the heat seal layer on one end and the heat seal layer on the other end, the heat seal layers facing each other in a direction orthogonal to an axis of the cylindrical part; and
an end welding part formed to extend in the direction orthogonal to the axis by thermally welding the heat seal layers on one end in the axial direction of the cylindrical part to each other.

11. The packaging container according to claim 10, wherein the packaging container is a pillow packaging container.

12. A packaging method for packaging contents with the packaging sheet according to claim 1, the packaging method comprising:
a bending step of bending the packaging sheet with a rectangular or band-like shape into a cylindrical shape;
an axial-direction welding part formation step of forming an axial-direction welding part that extends in an axial direction by thermally welding the heat seal layer on one end of the packaging sheet that is bent into the cylindrical shape and the heat seal layer on the other end, the heat seal layers facing each other in a direction orthogonal to an axis of the cylindrical part;
an end welding part formation step of forming an end welding part that extends in the direction orthogonal to the axis by thermally welding to each other the heat seal layers on an end in the axial direction of the packaging sheet bent into the cylindrical shape; and
a thermal printing step of thermally printing by heating a part of the heat-sensitive layer so as to develop the color.

13. The packaging method according to claim 12, wherein the thermal printing step is performed after the end welding part formation step.

* * * * *